United States Patent

Wu et al.

[11] Patent Number: 5,338,814
[45] Date of Patent: Aug. 16, 1994

[54] PROCESS FOR MAKING NARROW MOLECULAR WEIGHT DISTRIBUTION POLYVINYLPYRROLIDONE K-90 POLYMERS

[75] Inventors: Chi-San Wu; James F. Curry, both of Wayne, N.J.; James P. Cullen, Bartonsville, Pa.

[73] Assignee: ISP Investments Inc., Wilmington, Del.

[21] Appl. No.: 51,107

[22] Filed: Apr. 21, 1993

[51] Int. Cl.$^5$ .......................... C08F 2/04; C08F 26/10
[52] U.S. Cl. .................... 526/210; 526/209; 526/264
[58] Field of Search .................. 526/210, 209, 264

[56] References Cited

U.S. PATENT DOCUMENTS 4,699,146  10/1987  Sieverding .................. 128/640

Primary Examiner—Joseph L. Schofer
Assistant Examiner—Wu C. Cheng
Attorney, Agent, or Firm—Walter Katz; Marilyn J. Maue; Joshua J. Ward

[57] ABSTRACT

A process for making polyvinylpyrrolidone (PVP) K-90 having a polydispersity of less than 6, preferably less than 5, and most preferably, less than 4, which comprises polymerizing vinylpyrrolidone monomer by free radical solution polymerization, in water, in the presence of polyethylene glycol (PEG) having a molecular weight of about 300 as a chain transfer agent. The product is an aqueous solution of 15-25% PVP K-90, preferably 20%, 15-30% PEG, preferably 25%, and 45-70% water, preferably 55%, by weight of the solution.

2 Claims, No Drawings

PROCESS FOR MAKING NARROW MOLECULAR WEIGHT DISTRIBUTION POLYVINYLPYRROLIDONE K-90 POLYMERS

BACKGROUND OF THE INVENTION

1. Field of the Invention

This invention relates to a process for making polyvinylpyrrolidone (PVP), and, more particularly, to free radical solution polymerization of vinylpyrrolidone monomer in water in the presence of polyethylene glycol (PEG) as a chain transfer agent to provide an aqueous solution of PVP K-90 having a polydispersity value of less than 6, preferably less than 5, and most preferably less than 4, and PEG, in predetermined concentration.

2. Description of the Prior Art

During free radical solution polymerization of high molecular weight polymers at a high conversion, auto acceleration can occur, resulting in polymers with broad distributions and polydispersities up to 10. For many applications, broad distribution polymers are satisfactory. However, at equivalent molecular weights, narrow molecular weight distribution polymers have certain advantages over broad distribution polymers, such as higher bulk (Brookfield) solution viscosities. Also, the molecular weight and molecular weight distribution of certain polymers can affect their electron-beam resist sensitivity.

The art has employed costly equipment and special processes to make high molecular weight polymers with narrow molecular weight distribution. See U.S. Pat. No. 3,862,915.

The molecular weight distribution of high molecular weight polymers can also be controlled in a free radical polymerization at high conversion using chain transfer agents as additives. In such processes, chain transfer can occur in the free radical polymerization between the growing chain and the monomer, polymer and/or solvent. chain transfer agents have hydrogen atoms or other atoms which are more labile in a free radical polymerization than the hydrogen atoms on the monomer or polymer.

The chain transfer agent thus functions by terminating a growing chain by providing a more labile hydrogen atom to the growing chain. This mechanism can be used to control the molecular weight distribution of the polymer obtained. At high conversion, the viscosity of the solution increases, and auto acceleration can occur due to the reduction in chain termination processes from combination or disproportionation of the growing chains. Therefore, molecules terminated at high conversion will have higher molecular weights than molecules terminated at low conversion, yielding broader distribution polymers at high conversion. Chain transfer agents thus can provide an alternative termination process which is not expected to be hindered by viscosity built-up during polymerization, thus preventing the growth of high molecular weight molecules and reducing the breadth of the distribution.

U.S. Pat. No. 4,750,482 describes a hydrophilic, elastomeric, pressure-sensitive adhesive which is made from a solution of 20% PVP (K-90) powder, 25% PEG and 55% water. Accordingly, it is desired to form such solution during preparation of PVP polymer without requiring isolation of the PVP powder.

Accordingly, it is an object of this invention to provide a process for making PVP K-90 having a narrow molecular weight distribution, suitably a polydispersity of less than 6, preferably less than 5, and most preferably less than 4.

Another object herein is to provide a process for making such PVP K-90 polymer directly in the form of an aqueous solution of the 15-25% PVP, 15-30% PEG and 45-70% water.

These and other objects and features of the invention will be made apparent from the following description thereof.

SUMMARY OF THE INVENTION

In this invention, a selected chain transfer agent is added to the vinylpyrrolidone monomer reaction mixture in a free radical polymerization to control the molecular weight, and molecular weight distribution (polydispersity) of the PVP polymer obtained. The amount and type of the chain transfer agent and the timing of addition in a free radical polymerization is selected so that polymers of predetermined molecular weights and distribution are produced. In this invention, polyethylene glycol (PEG) is used as a chain transfer agent to control the molecular weight and polydispersity of PVP.

What is described is a process for making polyvinylpyrrolidone (PVP) K-90 having a polydispersity of less than 6, preferably less than 5, and most preferably, less than 4, which comprises polymerizing vinylpyrrolidone monomer by free radical solution polymerization, in water, in the presence of polyethylene glycol (PEG) having a molecular weight of about 300 as a chain transfer agent. The product is an aqueous solution of 15-25% PVP K-90, preferably 20%, 15-30% PEG-300, preferably 25%, and 45-70% water, preferably 55%, by weight of the solution.

DETAILED DESCRIPTION OF THE INVENTION

In accordance with the invention, there is provided an aqueous, free radical polymerization process for making PVP K-90 (molecular weight of 500,000 to 800,000) having a narrow molecular weight distribution, suitably less than 6, preferably less than 5, and most preferably, less than 4. The process is characterized by the use of polyethylene glycol, or PEG, having a molecular weight of 300 (PEG-300) as a chain transfer agent in the free radical polymerization process. The PEG-300 may be included in the reaction mixture of vinylpyrrolidone, water and free radical initiator, or added during the polymerization, with a second charge of initiator. The product of the polymerization is an aqueous solution of PVP K-90 in PEG-300 comprising 15-25% of the PVP, 15-30% PEG-300 and 45-70% water, by weight of the solution, preferably 20% PVP, 25% PEG-300 and 55% water. Such solution can be used directly in the electroconductive adhesive product of U.S. Pat. No. 4,750,482 without requiring further processing into a PVP powder.

The invention will now be described more fully with reference to the following examples.

EXAMPLE 1

A one-liter, five necked, jacketed glass reaction flask accommodates a stirring shaft for mixing, a water cooled condenser to prevent vapor loss, a thermocouple to monitor temperature, a rubber septum for introducing initiator and removing sample, and a nitrogen sparge tube. The flask allows for a positive pressure of nitrogen to be maintained during the process by bubbling nitrogen through the mixture for 20 minutes before reaction.

The reaction mixture is prepared by mixing 130 g of vinylpyrrolidone (BP), 100.2 g PEG-300 and 300 g of distilled/deionized water. 0.0124 g of EDTA is added to the mixture and stirred for at least 30 minutes to dissolve the EDTA. The pH of the mixture is adjusted with 30% $NH_4OH$ to 9.3. The reaction mixture then is heated to 55° C. and 130 μl of Lupersol 11 (t-butylperoxy pivalate) initiator is added. The temperature is controlled between 60° C. to 64° C. during a reaction period of 2 hours. Then an additional charge of 130 μl of Lupersol 11 is added and the temperature is controlled between 60° C. and 65° C. for another 2 hours. The temperature is then raised to 80° C. for 30 minutes to complete the reaction. The total amount of Lupersol 11 used is 0.15% (v/w of VP). An aqueous solution containing 20% PVP, 20% PEG-300 and 60% water is obtained. The PVP in the solution had a polydispersity of 3.7, and a $M_w$ of 509,000*.

\* The molecular weight and molecular weight distribution (polydispersity) of PVP in the solution were determined by GPC with narrow distribution polyethylene oxide as the calibration standard.

EXAMPLE 2

The procedure of Example 1 was repeated except that 170 g of VP, 400 g of water with 0.0039% EDTA, and 0.85 g of PEG-300 (0.5% by weight of VP) were charged. One hour later, 2.57 g of PEG-300 and 34 g of water were charged. Three hours later 204 g of PEG-300 and 0.2 g of Vazo-67 were charged. The final solution had a PVP content of 20%, a PEG-300 content of 25%, a polydispersity of 4.79, a MW 673,000, and a residual VP content of 0.05%.

EXAMPLE 3

The procedure of Example 1 was repeated except that 118 g of VP, 300 g of water, 118 g of PEG-300 and 0.0185 g of EDTA were charged. The first addition of Lupersol 11 (70 μl) was made at 55° C. and temperature was held between 53° C. to 55° C. for 3 hours. Then the second charge of Lupersol 11 (70 μl) was added and the temperature was held between 53° C. to 58° C. for another 2 hours. A third charge of Lupersol 11 (70 μl) was added and the temperature was held between 53° C. and 58° C. for one more hour. The temperature was finally raised to between 62° C. and 65° C. for one hour to complete the reaction. The total amount of Lupersol 11 used was 0.133% (v/w of VP). The PVP in the aqueous solution obtained had a polydispersity of 3.6 and a $M_w$ of 540,000.

A summary of the results of Examples 1–3 is given in the following Table.

TABLE

| | | | POLYMER SOLUTION | | | | |
|---|---|---|---|---|---|---|---|
| Ex. | % PVP | % VP | % PEG | % $H_2O$ | $M_w$ | $M_n$ | $M_w/M_n$ |
| 1 | 24.20 | 0.31 | 20.56 | 54.93 | 509,000 | 139,000 | 3.7 |
| 2 | 20.04 | 0.05 | 25.00 | 54.90 | 673,000 | 143,191 | 4.7 |
| 3 | 21.51 | 0.34 | 24.76 | 53.39 | 540,000 | 149,000 | 3.6 |

What is claimed is:

1. A process for making polyvinylpyrrolidone K-90 having a polydispersity of less than 6, which comprises polymerizing vinylpyrrolidone monomer by free radical solution polymerization in water in the presence of polyethylene glycol having a molecule weight of about 300 as a chain transfer agent.

2. A process according to claim 1, in which the reaction mixture comprises 15–25% vinylpyrrolidone, 15–30% polyethylene glycol-300 and 45–70% water.

* * * * *